United States Patent
Xiao et al.

(10) Patent No.: US 9,419,987 B2
(45) Date of Patent: Aug. 16, 2016

(54) METHOD AND DEVICE FOR PROMPTING INFORMATION ABOUT E-MAIL

(71) Applicant: BEIJING QIHOO TECHNOLOGY COMPANY LIMITED, Beijing (CN)

(72) Inventors: Rui Xiao, Beijing (CN); Peng Xiao, Beijing (CN); Ming Xiang, Beijing (CN); Gan Ning, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 14/387,294

(22) PCT Filed: Mar. 14, 2013

(86) PCT No.: PCT/CN2013/072587
§ 371 (c)(1),
(2) Date: Sep. 23, 2014

(87) PCT Pub. No.: WO2013/139223
PCT Pub. Date: Sep. 26, 2013

(65) Prior Publication Data
US 2015/0058978 A1    Feb. 26, 2015

(30) Foreign Application Priority Data

Mar. 23, 2012  (CN) .......................... 2012 1 0080856

(51) Int. Cl.
*G06F 11/00*     (2006.01)
*H04L 29/06*     (2006.01)
*G06F 21/51*     (2013.01)
*G06F 21/56*     (2013.01)
*H04L 12/58*     (2006.01)

(52) U.S. Cl.
CPC ............ *H04L 63/1408* (2013.01); *G06F 21/51* (2013.01); *G06F 21/56* (2013.01); *H04L 51/12* (2013.01); *H04L 51/18* (2013.01); *H04L 63/1483* (2013.01); *H04L 63/126* (2013.01)

(58) Field of Classification Search
CPC .................................................. H04L 63/1416
USPC ..................................... 726/22; 713/182, 188
See application file for complete search history.

(56) References Cited

U.S. PATENT DOCUMENTS

| | | | |
|---|---|---|---|
| 2002/0004813 A1* | 1/2002 | Agrawal et al. | 709/201 |
| 2002/0143871 A1* | 10/2002 | Meyer et al. | 709/204 |
| 2006/0184632 A1* | 8/2006 | Marino et al. | 709/206 |
| 2006/0248575 A1 | 11/2006 | Levow et al. | |
| 2008/0244715 A1* | 10/2008 | Pedone | 726/5 |

(Continued)

OTHER PUBLICATIONS

International Search Report regarding Chinese International Application No. PCT/CN2013/072587 issued Jun. 27, 2013, 4 pages.

(Continued)

*Primary Examiner* — Christopher Brown
(74) *Attorney, Agent, or Firm* — James Stipek; John Bednarz; Polsinelli PC

(57) ABSTRACT

The present invention discloses a method and a device for prompting information about an e-mail. The method comprises: extracting information from a currently opened e-mail; according to the extracted information, determining whether an unsafe webpage link is contained in content of the currently opened e-mail; and if yes, providing security prompting information to a user. By means of the present invention, security is ensured when a person uses an e-mail box.

17 Claims, 2 Drawing Sheets

(56) References Cited

U.S. PATENT DOCUMENTS

2010/0312621 A1* 12/2010 Abdulhayoglu ............. 705/14.4
2012/0158626 A1* 6/2012 Zhu et al. ........................ 706/13

OTHER PUBLICATIONS

English translation of abstract only of Chinese application CN1588879A, Publication date: Mar. 2, 2005, Country: CN, Inventors: Xiangyang Xue, et al., one page.

English translation of abstract only of Chinese application CN101154231A, Publication date: Apr. 2, 2008, Country: CN, Inventors: Zhiping Meng, one page.

English translation of abstract only of Chinese application CN101221611A, Publication date: Jul. 16, 2008, Country: CN, Inventors: Lee Bates Cary, et al, one page.

English translation of abstract only of Chinese application CN102045667A, Publication date: May 4, 2011, Country: CN, Inventors: Shiwei Zhang, et al, one page.

English translation of abstract only of Chinese application CN102098235A, Publication date: Jun. 15, 2011, Country: CN, Inventors: Weifeng Zhang, et al, one page.

English translation of abstract only of Chinese application CN102255922A, Publication date: Nov. 23, 2011, Country: CN, Inventors: Peiyu Liu, et al, one page.

* cited by examiner

METHOD AND DEVICE FOR PROMPTING INFORMATION ABOUT E-MAIL

FIELD OF THE INVENTION

The present invention relates to the field of computer technology, especially relates to a method and a device for prompting information about an e-mail.

BACKGROUND OF THE INVENTION

An e-mail box is an electronic information space for network communication provided by the network electronic post office for network clients. The e-mail box has the functions of storing and sending&receiving electronic information, and is an importance information communication tool in internet. By means of the e-mail box, the user may send and receive e-mails anywhere and anytime, which makes people's life to be greatly convenient.

The e-mail box service with the webpage as the interface is a common manner of e-mail box service, in this manner, one can enter the log-in page of the e-mail box through a webpage browser, then fill in data such as the user name and password etc. in the log-in form in the log-in page, and then click a submission button such as "log-in" to accomplish log-in of the e-mail box, thus the operations of sending&receiving, reading e-mails can be performed.

However, there may be some security risks in the process of using an e-mail box by people. For example, people often receive lottery e-mails, and are cheated when clicking the link in the e-mail, which results in damage of users' property or personal privacy; people are interested in receiving a dating e-mail, but find that the computer becomes more and more slowly after clicking the e-mail; people see the commodities in the e-mail very cheap and click them, as a result, many advertisements pop up; if a link in an e-mail from a stranger is clicked, the home page will be changed inexplicably and even cannot be changed back; if a link in a mass e-mail is clicked, many software programs will be installed and even cannot be uninstalled, and the like.

Therefore, how to ensure security of people in using an e-mail box becomes a problem that needs to be solved by the skilled person in the art urgently.

SUMMARY OF THE INVENTION

In view of the above problem, the present invention is proposed to provide a method and a device for prompting information about an e-mail for overcoming the above problems or at least partially solving or mitigating the above problems.

According to an aspect of the present invention, a method for prompting information about an e-mail is provided, comprising: extracting information from a currently opened e-mail;

according to the extracted information, determining whether an unsafe webpage link is contained in the content of the currently opened e-mail;

if yes, providing security prompting information to a user.

According to another aspect of the present invention, a device for prompting information about an e-mail is provided, comprising:

an information extracting unit configured to extract information from a currently opened e-mail;

a determining unit configured to determine whether an unsafe webpage link is contained in the content of the currently opened e-mail according to the extracted information;

a prompting unit configured to, if yes, provide security prompting information.

According to a further aspect of the present invention, a computer program comprising a computer readable code is provided, when the computer readable code runs on a server, the server is caused to perform a method for prompting information about an e-mail according to any of claims 1 to 9.

According to yet another aspect of the present invention, a computer readable medium is provided, in which a computer program is stored.

The beneficial effect of the present invention is:

By means of the present invention, some information can be extracted from an e-mail opened by a user, then it is determined whether an unsafe webpage link is contained in the content of the e-mail based on these information, if yes, prompting information may be provided to the user so as to attract the user's attention. In this way, the user will no longer click the corresponding webpage link according to the prompting information, such that the user will not be infringed by malicious links, namely, security in using an e-mail is ensured.

The above is only a summary of the technical solution of the present invention. In order to understand the technical measures of the present invention more clearly so as to be carried out according to the contents of the description, and in order to make the above and other purposes, features and advantages of the present invention more obvious and easily understood, specific embodiments of the present invention will be particularly listed as follows.

BRIEF DESCRIPTION OF THE DRAWINGS

By reading the detailed description of the preferred embodiments hereinbelow, various other advantages and benefits will be clear for the ordinary skilled person in the art. The drawings are only used for the purpose of showing the preferred embodiments, while not regarded as limitations to the present invention. Moreover, the same reference sign represents the same component in the whole drawings. In the drawings.

DETAILED DESCRIPTION OF THE INVENTION

Next, the present invention will be described further in combination with the drawings and specific embodiments.

Figure 1:
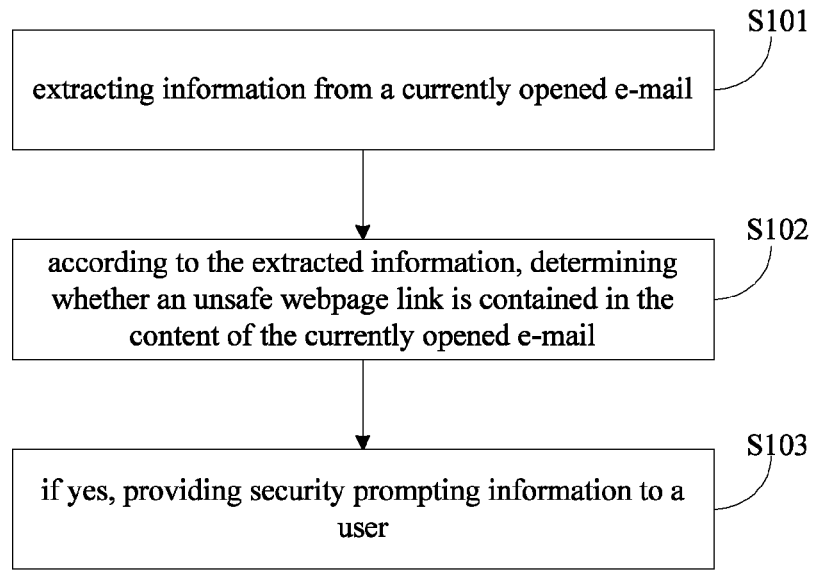
FIG. 1 schematically shows a flow chart of a method provided according to an embodiment of the present invention.

Referring to FIG. 1, a method for prompting information about an e-mail provided by an embodiment of the present invention comprises the steps of:

S101: extracting information from a currently opened e-mail;

in the embodiment of the present invention, with respect to a currently opened e-mail by the user, it is detected whether an unsafe webpage link is contained in the content of the e-mail. Wherein the currently opened e-mail may be an e-mail that is currently in focus, i.e., an e-mail being currently displayed in a current user interface, and may also comprise other e-mail that has been opened currently but not in focus yet. Specifically, when a currently opened e-mail is learnt, the manner of based on event response can be used, for example, an event that a user clicks a certain e-mail can be monitored, when the occurrence of the event is monitored, it can be learnt that the user opens a certain e-mail. More specific carrying out manners may be represented in the following introductions.

S102: determining whether an unsafe webpage link is contained in content of a current opened e-mail according to the extracted information;

When determining whether an unsafe webpage link is contained in the content of an e-mail specifically, there may be various ways for carrying it out based on the different extracted information, for example, in one of the ways, a webpage link contained in the content of the e-mail may be extracted firstly, then security of the webpage link is detected, so as to determine whether an unsafe webpage link is contained in the content of the e-mail according to the detection result; or the title and/or sender information (which may include the e-mail address, name etc. of the sender) of the currently opened e-mail may be extracted, then it is determined whether the tile and/or sender information appears in a preset blacklist (this blacklist may be obtained in advance through various approaches, and can be updated during the process of carrying out the embodiments of the present invention, what is recorded therein is that an unsafe link is contained in the content of the e-mail as for a specific e-mail title and/or sender information), if yes, it is determined that a safe webpage link is contained in the content of the currently opened e-mail; of course, the preceding two ways may also be combined, for example, the e-mail title and/or the sender information may be extracted firstly, then it is determined whether the e-mail title and/or the sender information appears in a preset blacklist, if not, a webpage link contained in the content of the e-mail may be further extracted, then the security of the webpage link is detected, so as to determine whether an unsafe webpage link is contained in the content of the e-mail according to the detection result, here, if the detection result show that an unsafe webpage link is indeed contained in the content of the e-mail, the e-mail title and/or the sender information of the e-mail may be further added into the blacklist, such that the blacklist is updated. In specific implementation, how to extract required information from an e-mail is an important content, which will be introduced in detail next.

In actual applications, a mailbox generally comprises a webpage mailbox and a client mailbox, wherein the webpage mailbox is namely a mailbox which logs in, sends and receives e-mails, as well as reads e-mails through a webpage, for example, the commonly used NetEase mailbox etc. The client mailbox refers to a tool software such as Foxmail, Outlook etc., the e-mails can be received at a local computer by using a mail client, the e-mails can still be read offline. In the embodiment of the present invention, the webpage link, e-mail title and/or sender information contained in the content of an e-mail can be extracted in different ways respectively with respect to the webpage mailbox and the client mailbox.

Firstly, regarding the webpage mailbox, since the e-mail in the webpage mailbox corresponds to a webpage, moreover, the user opens the log-in page of the webpage mailbox through a browser, the contents including the folder list (e.g. inbox, outbox, sent box etc.) in the mailbox are displayed through the browser page after successful log-in, after a certain folder is clicked, an e-mail list contained therein will be displayed, then a certain e-mail can be opened by clicking and selecting the e-mail from the e-mail list, the text content of the e-mail will be displayed in the webpage. Therefore, corresponding functions can be implemented by adding new functions for the browser or providing a browser plug-in.

In addition, Browser Helper Object (BHO) is an industry standard for the browser to open an interactive interface to a third party programmer, the "interactive interface" in the browser field can be entered only through simple codes. The programmers can write codes through this interface to acquire behaviors of the browser, such as "backward", "forward", "current page" etc., the programmers can also control the browser behaviors with the codes, such as modifying and replacing the tool bar of the browser, adding their own program buttons etc., there is no problem for the operation system. The former purposes of BHO are to help the programmers to create individualized browsers and to provide more simple interactive functions for the programs, many individualized tools at present are carried out by using BHO.

Therefore, in the embodiment of the present invention, the BHO may also be used to achieve the aim of extracting a webpage link contained in the content of an e-mail. For example, a core module of a certain security tool as the BHO of the browser can perform filtering processing in response to various events generated in operation of the browser by the user. When the user logs in a webpage mailbox, a mail protection module can receive OnDocumentComplete event of the BHO, verify the URL of the current address bar of the browser, and enter the logic of processing the mail content if it is found that it is the webpage mail URL to be concerned.

When analyzing the content of an e-mail, since it may be performed after a user opens a certain e-mail and the text content of the e-mail is displayed in the webpage, here the text content is a subwebpage of the current webpage, hence, the Hypertext Markup Language (HTML) code of the webpage where the e-mail locates can be acquired, and then the HTML code of the webpage where the e-mail locates can be parsed based on the mode of a document object model (DOM) tree, in this way, the text content of the e-mail can be acquired, then, since the presentation of a webpage link in the page always exist in the form of a hyperlink, the target address of the webpage link (i.e., the URL of the target webpage to which the webpage link corresponds) can be acquired by an Application Programming Interface (API) function (e.g. GetURL) provided by the operation system, this is namely equivalent to extracting the webpage link contained therein. Of source, the title and/or the sender information of the e-mail can also be extracted by parsing the HTML code if necessary.

It needs to be explained here that the HTML DOM is a document object model that is specifically applicable for HTML/XTML. The HTML DOM can be understood as an API of the webpage. It loads all the data into the memory in a node hierarchies of Parent-Child to constitute a tree, these nodes may be in types of elements, texts, attributes, annotations or others. It allows the developer to read, create, delete and edit the HML data. That is to say, as for the webpage displayed after an e-mail is opened, the frame portion (including the folder list, title of the e-mail, sender address, receiver address, sending time and operation buttons of return, response, deletion etc.) displayed in the webpage as well as the text content of the e-mail are all regarded as nodes in the DOM tree. Hence, the desired information can be namely acquired by analyzing respective nodes in the DOM tree.

In specific implementation, the manner of traversing each node may be adopted to search information that matches with the key words (for example, taking "title" as the key word when it is required to acquire the title of the e-mail, etc.), however, this is time consuming and may occupy many resources. Therefore, in the embodiments of the present invention, another implementing manner may be adopted.

Specifically, in an e-mail page, the nodes in the DOM tree to which the page element corresponds generally have some features, such features refer to the name, ID, style type of the self element or the adjacent element in the DOM tree, as well as the relationship with the adjacent element, etc., for example, the title of the e-mail, the sender and so on may be fixed as the Mth node in the Nth layer of the DOM tree, etc., hence, when it is required to acquire certain information, the node can be found directly based on the node feature of the information in the DOM tree, and the corresponding information can be extracted. Of course, as for different webpage mailboxes, the node features of the page elements thereof in the DOM tree may be different, for example, as for a certain webpage mailbox, its e-mail title is the fourth node in the third layer of the DOM tree, while as for another webpage mailbox, its e-mail title is the second node in the fourth layer, etc. Therefore, with respect to different webpage mailboxes, it is further required to acquire the node features of the webpage elements thereof in the DOM tree, and then store them respectively, specifically when acquiring the required information based on the node features, it should be determined firstly what the current webpage mailbox is, then it is queried the node feature of the webpage element of the webpage mailbox in the DOM tree.

The conditions of the webpage mailboxes have been introduced above, next, the conditions of the client mailboxes will be introduced. As for a client mailbox, since it does not rely on a browser to exhibit the content of the e-mail, the above manner of BHO cannot be used, however, the embodiment of the present invention also provides corresponding implementing manners. Specifically, it may become a plug-in of the client mailbox by registration, and extract the content of the e-mail currently clicked and selected by the user corresponding to OnSelectionChange event. Specifically, when the user clicks and selects a certain e-mail, the data package to which the e-mail corresponds can be acquired, then the webpage link contained in the text content of is extracted by analyzing the data package. Wherein as for the data package of the e-mail, different data formats e.g. including TXT, RTF, HTML etc., may be used in different client mailboxes or different e-mail texts, and the code to which each format correspond is described in a different form, which also needs to be parsed through a corresponding parsing algorithm, however, the URL features contained therein are the same. Therefore, when it is required to extract a webpage link from the data package, the data format of the text content of the e-mail can be acquired through a Software Development Kit (SDK) function firstly, then the text content of the e-mail is read from the data package using a corresponding parsing algorithm based on the data format, and then it is processed as a TXT file, the character strings therein are parsed, character strings with features of being started with "http://" and followed by a valid domain name character string, or being started with "www" and being a valid domain name character string contained therein are searched, in this way, the URL data to which the webpage link corresponds can be extracted. In addition, if it is required to extract the title or the sender information of the e-mail, it can also be implemented through the SDK function.

Wherein, as stated above, the text content of the e-mail in the client mailbox needs to be read from the data package, thereby extracting the webpage link from the read characters; while as for the webpage link contained in the text content of the e-mail, when it is exhibited to the user, the anchor text of the webpage link might be a sentence, even might be a picture link etc., namely, what the user sees directly at the webpage link might not be the URL of the webpage to which the webpage link corresponds, instead, it is a sentence (generally with underlines, when the mouse cursor is placed on it, it may become "hand shape") or a picture, but when the user clicks this sentence or picture, the webpage to which the link corresponds will be opened; and the data package not only contains the anchor text, picture etc., of the link, but also contains the URL of the webpage to which the webpage link corresponds. Hence, when reading the text content of the webpage from the data package, the read content has actually contained the URL of the webpage to which the webpage link corresponds. Therefore, the webpage link contained in the webpage content can be read based on the features of the URL character string.

Specifically, when detecting security of the webpage link, it can be detected based on a preset database. For example, a malicious website library is preset, which contains malicious websites recorded through various approaches. Hence, after extracting the webpage link from the content of the e-mail, the extracted webpage link can be compared with the websites in the malicious website library to determine whether it comes up in the malicious website library, if yes, it will be determined that the webpage link is unsafe; if not, the webpage link can also be sent to the server for further detection. Wherein static features (e.g., comprising which webpage elements etc.) in the webpage to which the webpage link corresponds can be extracted at the server, the security of the webpage is determined through the static features; or the webpage to which the webpage link corresponds can be opened in the sandbox, dynamic features (e.g. whether a certain script is run automatically etc.) of the webpage are extracted, the security of the webpage is determined through the static features, etc. In a word, the server can adopt the methods in the prior art to detect security of the webpage, which will not be elaborated here.

S103: if yes, providing security prompting information to a user.

Specifically, when providing security prompting information to a user, the manners of popping bubbles can be used. For example, after the user clicks and selects a certain e-mail, if it is detected that an unsafe webpage link is contained in the text content of the e-mail, bubbles may popped out at the lower right corner etc., and the wordings such as "this e-mail contains an unsafe webpage link" may be presented, it may also prompt which webpage link is unsafe specifically. In this way, if the prompting information is noticed, the webpage link will not be clicked any more, thus the infringement of malicious information will be avoided.

Of course, if the title and/or sender information of the e-mail is also extracted at the same time, the corresponding title and/or sender information of the e-mail can also be recorded when a certain webpage link is detected unsafe, the blacklist can be updated and uploaded to the server. In this way, when it is required to determine whether other e-mails of the user contain unsafe webpage links, or to determine whether e-mails of other users contain unsafe webpage links, it can be determined firstly whether the extracted title and/or sender information of the e-mail appears in the blacklist, if yes, the user will be prompted directly, without needing to extract the link contained therein nor performing the subsequent security detection operation, thus the processing efficiency can be improved. Wherein, regarding the above manner of confirming through the blacklist, the blacklist can be stored at the Cloud, after the title and/or sender information of the e-mail are extracted, they can be sent to the Cloud for query; when a new e-mail containing an unsafe webpage link is detected in the manner of link detection, the title and/or sender information of the newly detected e-mail can be sent to the Cloud, the blacklist will be updated at the Cloud, such that the blacklist used in each comparison is in the latest state. Of course, in order to reduce occupation of bandwidth by data transmission and improve processing efficiency, the blacklist can also be downloaded to the local to perform comparison, meanwhile, it can also be updated periodically or aperiodically from the Cloud, etc.

In addition, it needs to be explained that as for the client mailbox, since the corresponding functions can be implemented in the form of a plug-in, in specific implementation, the data processing manner in asynchronization with the client e-mail can be used, namely, performing operations such as link extraction, detection etc., in an independent thread, at the same time of performing these operations, the client mailbox can respond to other operations of the user, thus the processing speed of the client mailbox itself will not be influenced. In addition, the plug-in in the embodiments of the present invention can use an event-based startup manner, i.e., the operations of extraction and detection etc. will not be performed unless the user clicks and selects a certain e-mail, hence, the startup speed of the client mailbox will not be influenced either.

By means of the above method provided by the embodiment of the present invention, some information can be extracted from the e-mail opened by the user, then it is determined whether the e-mail contains an unsafe webpage link based on these information, if yes, prompting information can be provided to the user so as to attract the user's attention. In this way, the user will not click the corresponding webpage link any more based on the prompting information, thus the user will not be infringed by the malicious link, namely, the security in using an e-mail is ensured.

Figure 2:
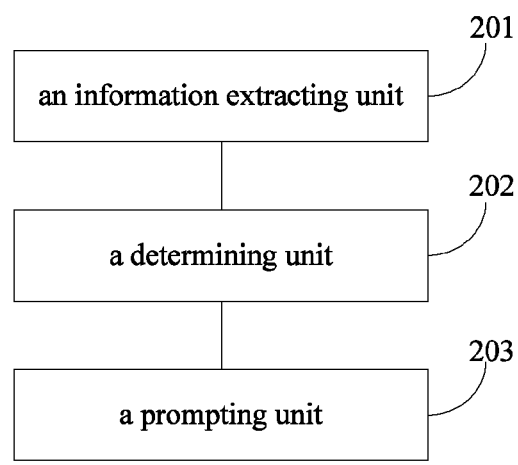
FIG. 2 shows a schematic view of a device provided according to an embodiment of the present invention.

Corresponding to a method for prompting information about an e-mail provided by the embodiment of the present invention, the embodiment of the present invention further provides a device for prompting information about an e-mail, referring to FIG. 2, the device may comprise:

an information extracting unit 201 configured to extract information from a currently opened e-mail;

a determining unit 202 configured to determine whether an unsafe webpage link is contained in content of a currently opened e-mail according to the extracted information;

a prompting unit 203 configured to, if yes, provide security prompting information to a user;

wherein the information extracting unit 201 may comprise:

a link extracting subunit configured to extract a webpage link contained in content of an e-mail;

correspondingly, the determining unit 202 may comprise:

a security detecting subunit configured to detect security of the webpage link, so as to determine whether an unsafe webpage link is contained in the content of the e-mail according to the detection result.

Or, the information extracting unit 201 may also comprise:

an e-mail title and/or sender information extracting subunit configured to extract an e-mail title and/or sender information of a currently opened e-mail;

correspondingly, the determining unit 202 may comprise:

a list comparison subunit configured to determine whether the e-mail title and/or sender information appears in a preset blacklist, if yes, it is determined that a safe webpage link is contained in the content of the currently opened e-mail.

Or, the above two manners are combined, if the e-mail title and/or sender information does not appear in a preset blacklist, the information extracting unit 201 may further comprise:

a link extracting subunit configured to extract a webpage link contained in content of an e-mail;

correspondingly, the determining unit 202 may further comprise:

a security detecting subunit configured to detect security of the webpage link, so as to determine whether an unsafe webpage link is contained in the content of the e-mail according to the detection result.

Wherein the e-mail comprises an e-mail in a webpage mailbox opened by a user, the link extracting subunit comprises:

a first text content extracting subunit configured to parse a Hypertext Markup Language (HTML) code of a webpage where the e-mail locates based on a Document Object Model (DOM) tree, so as to extract text content of the e-mail therefrom;

a first link extracting subunit configured to extract from the text content of the e-mail a webpage link contained therein by using an Application Programming Interface (API) function provided by an operation system.

In specific implementation, the first text content extracting subunit may comprise:

a parsing subunit configured to parse the HTML code of the webpage where the e-mail location based on the DOM tree according to a preset node feature of a webpage element of the current webpage mailbox in the DOM tree.

Wherein the e-mail may further comprise an e-mail in a client mailbox opened by a user, the link extracting subunit comprises:

a data package and data format acquiring subunit configured to acquire a data package and a data format of the e-mail according to a Software Development Kit (SDK) function;

a second text content extracting unit configured to read the text content of an e-mail from the data package according to the data format;

a second link extracting subunit configured to parse a character string contained in the text content so as to extract a webpage link from the text content according to a character string feature to which a preset webpage link corresponds.

Wherein, in order to avoid influence to normal processing of the client mailbox, said functions may be implemented by using a plug-in of the client mailbox, the plug-in uses a data processing manner in asynchronization with the client mailbox.

In order to update the blacklist, the device may further comprise:

a blacklist updating unit configured to add the title and/or sender information of an e-mail into the blacklist if the detection result shows that an unsafe webpage link is contained in the content of the e-mail.

By means of the above device provided by the embodiment of the present invention, some information can be extracted from the e-mail opened by the user, then it is determined whether the e-mail contains an unsafe webpage link based on these information, if yes, prompting information can be provided to the user so as to attract the user's attention. In this way, the user will not click the corresponding webpage link any more based on the prompting information, thus the user will not be infringed by the malicious link, namely, the security in using an e-mail is ensured.

The embodiments of respective components of the present invention can be carried out in hardware, or in software modules run on one or more processors, or in the combination thereof. The skilled person in the art should understand that a microprocessor or a digital signal processor (DSP) can be used in practice to implement some or all functions of some or all components in the device for prompting information about an e-mail according to the embodiment of the present invention. The present invention can also be carried out as part or all of the device or device program (e.g., computer program and computer program product) for performing the method described here. Such a program for carrying out the present invention can be stored on a computer readable medium, or may have the form of one or more signals. Such signals can be downloaded from the internet website, or be provided on a carrier signal, or be provided in any other forms.

Figure 3:
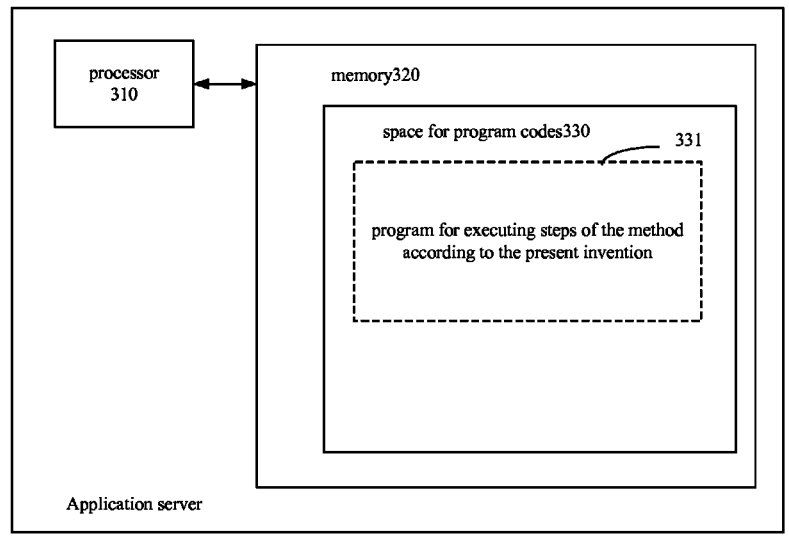
FIG. 3 schematically shows a block view of a server for performing a method according to the present invention.
Figure 4:
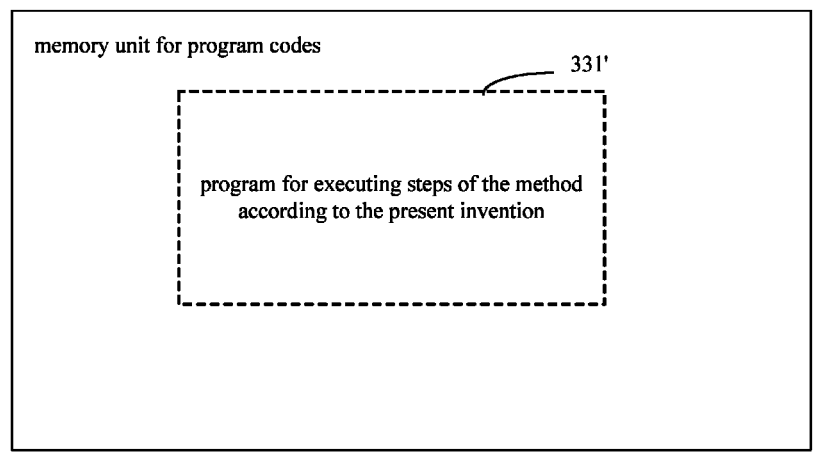
FIG. 4 schematically shows a storage unit for storing or carrying a program code carrying out a method according to the present invention.

For example, FIG. 3 shows a server that can carry out a method for prompting information about an e-mail according to the present invention, e.g., an application server. The server conventionally comprises a processor 310 and a computer program product or a computer readable medium in the form of memory 320. The memory 320 may be an electronic memory such as a flash memory, an EEPROM (electrically erasable programmable read-only memory), an EPROM, a hard disk or a ROM and the like. The memory 320 has a memory space 330 of a program code 331 for performing any method steps in the above method. For example, the memory space 330 for the program code may comprise respective program codes 331 for carrying out respective steps in the above method respectively. These program codes can be read from or written into one or more computer program products. These computer program products include program code carriers such as hard disks, compact disks (CD), memory cards or floppy disks and the like. Such computer program products are generally portable or fixed memory units as shown in FIG. 4. The memory unit can have a memory segment, a memory space etc. arranged similarly as the memory 320 in the server of FIG. 3. The program code may be compressed for example in an appropriate form. Generally, the memory unit comprises a computer readable code 331', i.e., a code that can be read by e.g. a processor such as 310 and the like, when these codes are run by the server, the server performs respective steps in the method described above.

The so-called "an embodiment" "embodiments" or "one or more embodiments" in this text means that the specific features, structures or characteristics described in combination with the embodiments are comprised in at least one embodiment of the present invention. In addition, please note that the word example of "in an embodiment" here does not always refer to the same embodiment.

In the description provided here, large amount of specific details are explained. However, it can be understood that the embodiments of the present invention can be practiced without these specific details. In some examples, the well known method, structure and technology are not shown specifically, so as not to make the understanding to the description ambiguous.

It should be noted that the above embodiments are explanations to the present invention rather than limitations to the present invention, moreover, the skilled person in the art can design alternative embodiments without departing from the scope of the attached claims. In the claims, any reference signs located between parentheses should not be taken as limitations to the claims. The word "comprise" does not exclude elements or steps not listed in the claims. The word "a" or "an" before the element does not exclude multiple such elements. The present invention can be carried out by means of hardware comprising several different elements and by means of an appropriately programmed computer. In a unit claim in which several means are listed, several of these means may be embodied by the same hardware item. The use of the words like first, second and third etc. does not represent any order. These words can be explained as names.

In addition, it should also be noted that the language used in this description is selected mainly for the purpose of readability and teaching, rather than for explaining or defining the subject matter of the present invention. Therefore, many modifications and variations are obvious for the ordinary skilled person in the art without departing from the scope and spirit of the attached Claims. As for the scope of the present invention, the disclosure made to the present invention is illustrative rather than limitative, the scope of the present invention is defined by the attached Claims.

The invention claimed is:

1. A method for prompting information about an e-mail, comprising:
   extracting information from one of a currently opened e-mail in a webpage mailbox opened by a user or a currently opened e-mail in a client mailbox opened by the user, the extracting information comprising one of:
   (1) when the e-mail comprises the e-mail in the webpage mailbox opened by the user, parsing Hypertext Markup Language (HTML) code of the webpage providing the e-mail based on a Document Object Model (DOM) tree, directly finding a node in the DOM tree according to a preset node feature of the node in the DOM tree, and extracting the information from a webpage element corresponding to the node, wherein the preset node feature comprising the webpage element is an Mth node in an Nth layer of the DOM tree in a current webpage and comprises an e-mail title and/or sender information of the currently opened e-mail, each particular webpage mailbox having a different corresponding preset node feature with a different Mth node in an Nth layer of the DOM tree that is determined; or
   (2) when the e-mail comprises the e-mail in the client mailbox opened by the user, acquiring a data package and a data format of the e-mail according to a software development kit (SDK) function, and extracting the information of the e-mail from the data package according to the data format;
   according to the extracted information, determining whether an unsafe webpage link is contained in content of the currently opened e-mail; and
   when the unsafe webpage link is contained in the content of the currently opened e-mail, providing security prompting information to the user.

2. The method according to claim 1, wherein extracting information from the currently opened e-mail comprises:
   extracting the webpage link contained in the content of the e-mail;
   and, determining whether the unsafe webpage link is contained in the content of the currently opened e-mail according to the extracted information comprises:
   detecting security of the webpage link, to determine whether the unsafe webpage link is contained in content of the e-mail according to the detection result.

3. The method according to claim 1, wherein extracting information from the currently opened e-mail comprises:
   extracting the e-mail title and/or sender information of the currently opened e-mail;
   and, the determining whether the unsafe webpage link is contained in content of the currently opened e-mail comprises:
   determining whether the e-mail title and/or the sender information appears in a preset blacklist, if yes, it is determined that the unsafe webpage link is contained in the content of the currently opened e-mail.

4. The method according to claim 3, wherein if the e-mail title and/or the sender information does not appear in the preset blacklist, extracting information from the currently opened e-mail further comprises:

extracting the webpage link contained in the content of the e-mail;

and, determining whether the unsafe webpage link is contained in the content of the currently opened e-mail further comprises:

detecting security of the webpage link, to determine whether the unsafe webpage link is contained in the content of the e-mail according to the detection result.

5. The method according to claim 2, wherein the e-mail comprises the e-mail in the webpage mailbox opened by the user, and the extracting the webpage link contained in the content of the e-mail comprises:

extracting text content of the e-mail; and extracting from the text content of the e-mail the webpage link contained therein using an Application Programming Interface (API) function provided by an operating system.

6. The method according to claim 2, wherein the e-mail comprises the e-mail in the client mailbox opened by the user, and extracting the webpage link contained in text content of the e-mail comprises:

reading the text content of the e-mail; and parsing a character string contained in the text content, to extract the webpage link from the text content according to a preset character string feature to which a webpage link corresponds.

7. The method according to claim 6, the method executed by a plug-in of the client mailbox, the plug-in performing data processing in asynchronization with the client mailbox.

8. The method according to claim 4, further comprising:

adding the title and/or the sender information of the e-mail into a blacklist if the detection result shows that the unsafe webpage link is contained in the content of the e-mail.

9. A device for prompting information about an e-mail, comprising:

a memory having instructions stored thereon;

a processor configured to execute the instructions to perform operations for prompting information about an e-mail, the operations comprising:

extracting information, from one of a currently opened e-mail in a webpage mailbox opened by a user or a currently opened e-mail in a client mailbox opened by the user, the extracting information comprising one of:

(1) when the e-mail comprises the e-mail in the webpage mailbox opened by the user, parsing Hypertext Markup Language (HTML) code of the webpage providing the e-mail based on a Document Object Model (DOM) tree, directly finding a node in the DOM tree according to a preset node feature of the node in the DOM tree, and extracting the information from a webpage element corresponding to the node, wherein the preset node feature comprising the webpage element is an Mth node in an Nth layer of the DOM tree in a current webpage and comprises an e-mail title and/or sender information of the currently opened e-mail, each particular webpage mailbox having a different corresponding preset node feature with a different Mth node in an Nth layer of the DOM tree that is determined; or (2) when the e-mail comprises the e-mail in the client mailbox opened by the user, acquiring a data package and a data format of the e-mail according to a software development kit (SDK) function, and extracting the information of the e-mail from the data package according to the data format;

determining whether an unsafe webpage link is contained in content of the currently opened e-mail according to the extracted information; and when the unsafe webpage link is contained in the content of the currently opened e-mail, providing security prompting information to the user.

10. The device according to claim 9, wherein extracting information from the currently opened e-mail comprises:

extracting the webpage link contained in the content of the e-mail;

and, the determining whether the unsafe webpage link is contained in the content of the currently opened e-mail according to the extracted information comprises:

detecting security of the webpage link, to determine whether the unsafe webpage link is contained in the content of the e-mail according to the detection result.

11. The device according to claim 9, wherein the extracting information from the currently opened e-mail comprises:

extracting the e-mail title and/or sender information of a currently opened e-mail;

and, the determining whether the unsafe webpage link is contained in content of the currently opened e-mail comprises:

determining whether the e-mail title and/or sender information appears in a preset blacklist, if yes, determining that the unsafe webpage link is contained in the content of the currently opened e-mail.

12. The device according to claim 11, wherein if the e-mail title and/or the sender information does not appear in the preset blacklist, extracting information from the currently opened e-mail further comprises:

extracting the webpage link contained in the content of the e-mail;

and, the determining whether the unsafe webpage link is contained in the content of the currently opened e-mail further comprises:

detecting security of the webpage link, to determine whether the unsafe webpage link is contained in the content of the e-mail according to the detection result.

13. The device according to claim 10, wherein the e-mail comprises the e-mail in the webpage mailbox opened by the user, the extracting the webpage link contained in the content of the e-mail comprises:

extracting text content of the e-mail; and extracting from the text content of the e-mail, the webpage link contained therein using an Application Programming Interface (API) function provided by an operating system.

14. The device according to claim 10, wherein the e-mail comprises the e-mail in the client mailbox opened by the user, the extracting the webpage link contained in the text content of the e-mail comprises:

reading text content of the e-mail; and parsing a character string contained in the text content, to extract the webpage link from the text content according to a preset character string feature to which a webpage link corresponds.

15. The device according to claim 14, the operations executed by a plug-in of the client mailbox, the plug-in performing data processing in asynchronization with the client mailbox.

16. The device according to claim 12, the operations for prompting information about the e-mail further comprising:

adding the e-mail title and/or sender information into the blacklist if the detection result shows that the unsafe webpage link is contained in the content of the e-mail.

17. A non-transitory computer readable medium, comprising computer readable code, that when executed by a computing device causes the device to carry out operations for prompting information about an e-mail, the operations comprising:
    extracting information from one of a currently opened e-mail in a webpage mailbox opened by a user or a currently opened e-mail in a client mailbox opened by the user, the extracting information comprising one of:
        (1) when the e-mail comprises the e-mail in the webpage mailbox opened by the user, parsing Hypertext Markup Language (HTML) code of the webpage providing the e-mail based on a Document Object Model (DOM) tree, directly finding a node in the DOM tree according to a preset node feature of the node in the DOM tree, and extracting the information from a webpage element corresponding to the node, wherein the preset node feature comprising the webpage element is an Mth node in an Nth layer of the DOM tree in a current webpage and comprises an e-mail title and/or sender information of the currently opened e-mail, each particular webpage mailbox having a different corresponding preset node feature with a different Mth node in an Nth layer of the DOM tree that is determined; or
        (2) when the e-mail comprises the e-mail in the client mailbox opened by the user, acquiring a data package and a data format of the e-mail according to a software development kit (SDK) function, and extracting the information of the e-mail from the data package according to the data format;
    according to the extracted information, determining whether an unsafe webpage link is contained in content of the currently opened e-mail; and
    when the unsafe webpage link is contained in the content of the currently opened e-mail, providing security prompting information to the user.

\* \* \* \* \*